United States Patent [19]
Condon

[11] Patent Number: 5,421,541
[45] Date of Patent: Jun. 6, 1995

[54] WEDGE FOR THROUGH-HOLE MOUNTING OF PIPE

[76] Inventor: Duane R. Condon, 2330 Raymond Ave., Ramona, Calif. 92065

[21] Appl. No.: 288,434

[22] Filed: Aug. 9, 1994

Related U.S. Application Data

[63] Continuation of Ser. No. 144,997, Oct. 29, 1993, abandoned, which is a continuation of Ser. No. 959,703, Oct. 13, 1992, abandoned.

[51] Int. Cl.⁶ ............................................. F16L 5/00
[52] U.S. Cl. ........................................ 248/56; 16/2
[58] Field of Search ............... 248/56, 73, 74.1, 68.1, 248/221.4, 316.1; 174/153 G; 16/2; 254/104; 285/421, 194, 217

[56] References Cited

U.S. PATENT DOCUMENTS

| | | | |
|---|---|---|---|
| 780,957 | 1/1905 | Palmer | 248/231.91 |
| 1,794,476 | 3/1931 | Taylor | 248/56 |
| 2,236,496 | 4/1941 | Beggs | 16/2 X |
| 2,828,147 | 3/1958 | Peiffer | 248/56 X |
| 2,920,129 | 1/1960 | Rapata | 174/153 G |
| 3,056,852 | 10/1962 | Sachs | 16/2 X |
| 3,366,356 | 1/1968 | Fisher | 248/56 |
| 3,424,856 | 1/1969 | Coldren | 248/56 |
| 3,502,917 | 3/1970 | Bizoe | 174/153 G |
| 3,562,847 | 2/1971 | Jemison | 248/56 |
| 3,684,220 | 8/1972 | Logsdon | 248/56 |
| 4,262,409 | 4/1981 | Madej | 248/56 X |
| 4,400,920 | 8/1983 | Logsdon | 248/56 X |
| 4,460,805 | 7/1984 | Johnson | 248/56 X |
| 4,625,489 | 12/1986 | Bögle | 254/104 X |
| 4,678,146 | 7/1987 | Plyler | 248/56 |
| 5,213,290 | 5/1993 | Moretti | 248/56 |
| 5,276,280 | 1/1994 | Ball | 248/56 X |

*Primary Examiner*—Ramon O. Ramirez
*Assistant Examiner*—Korie H. Chan
*Attorney, Agent, or Firm*—Baker, Maxham, Jester & Meador

[57] ABSTRACT

A device for rigidly mounting a pipe extending through a hole in a wooden structural support in such a manner that there is a gap between the pipe and the structural support. The device comprises a generally wedge-shaped member having a rear-end engageable by a hammer for driving the wedge-shaped member into the gap snugly between the wooden structural support and the pipe and having a plurality of projections spaced along a longitudinal dimension thereof for engaging the inner wall of the hole for preventing the wedge-shaped member from backing out of the gap.

8 Claims, 1 Drawing Sheet

WEDGE FOR THROUGH-HOLE MOUNTING OF PIPE

This is a continuation of application Ser. No. 08/144,997, filed Oct. 29, 1993, now abandoned and which is a continuation of application Ser. No. 07/959,703, filed Oct. 13, 1992, now abandoned.

BACKGROUND OF THE INVENTION

The present invention relates to pipe holders for use in holding or mounting pipes with respect to structural supports, and more particularly, to a plastic wedge for mounting copper and other water pipe in holes drilled through studs, headers and joists.

Copper pipe is widely utilized for conveying hot water in residences and commercial buildings. It is sometimes difficult to mount copper pipe to structural supports such as studs, headers, joists and the like without damaging the pipe. There is considerable risk of damage in mounting of this type of pipe because of the relatively thin wall thickness thereof. Copper pipe has to be mounted in such a manner as to accommodate thermal expansion and contraction. If copper pipe is improperly held during these dimensional changes, it can be physically damaged.

Other factors are involved in the utilization of copper water pipe in plumbing installations. This type of pipe tends to transmit or convey sounds that result from fluid movement. It also tends to transmit heat. In modern buildings having comparatively thin partitions or walls, such transmission of sound and heat can be disadvantageous. Furthermore, copper pipe must be mounted in a manner that avoids contact with other metals to eliminate damage as a result of electrolysis or galvanic action.

U.S. Pat. No. 3,684,220 of Logsdon discloses a plastic pipe holder having a split cylinder configuration. The pipe holder has circumferential ribs and must be pounded into a hole having a predetermined diameter pre-drilled into a structural support. U.S. Pat. No. 4,930,733 of Logsdon discloses a similar pipe holder with a plurality of vanes and barbs for engaging the interior of the hole in the support member. U.S. Pat. No. 4,903,921 of Logsdon discloses a plastic pipe holder which surrounds the copper pipe and is nailed to the surface of the structural support.

SUMMARY OF THE INVENTION

It is the primary object of the present invention to provide an improved device for rigidly securing a pipe in a through-hole in a wooden structural support.

It is another object of the present invention to provide such a device that does not have to be manufactured in a plurality of different sizes depending upon the diameter of the pipe.

It is another object of the present invention to provide such a device which is adaptable to a range of through-hole sizes.

The present invention provides a device for rigidly mounting a pipe extending through a hole in a wooden structural support in such a manner that there is a gap between the pipe and the structural support. The device comprises a generally wedge-shaped member having a rear end engageable by a hammer for driving the wedge-shaped member into the gap snugly between the wooden structural support and the pipe. The wedge-shaped member has plurality of projections spaced along a longitudinal dimension thereof for engaging the inner wall of the hole for preventing the wedge-shaped member from backing out of the gap.

The preferred embodiment of the wedge-shaped member has a pair of parallel, spaced apart ribs having serrated outer edges. A plurality of retention barbs extend transversely between the ribs at spaced apart intervals. The rear end of the wedge-shaped member is provided with a semi-circular planar flange which may be engaged by a hammer. The wedge-shaped member has an underside with a plurality of discrete planar faces that extend at an angle relative to each other for contacting the pipe. One or more of the wedge-shaped devices is utilized to rigidly support the pipe in position within the hole in the wooden structural support. The pipe is thus prevented from moving or banging against the support during water hammer. Also, there is no chance of electrolysis or galvantic corrosion of the pipe due to the injection molded plastic construction of the wedge-shaped device. The device can be manufactured in high volume at a very low cost and can be conveniently installed by the plumber. One size of wedge will accommodate a wide range of pipe and hole diameters.

DESCRIPTION OF THE PREFERRED EMBODIMENT

Figure 1:
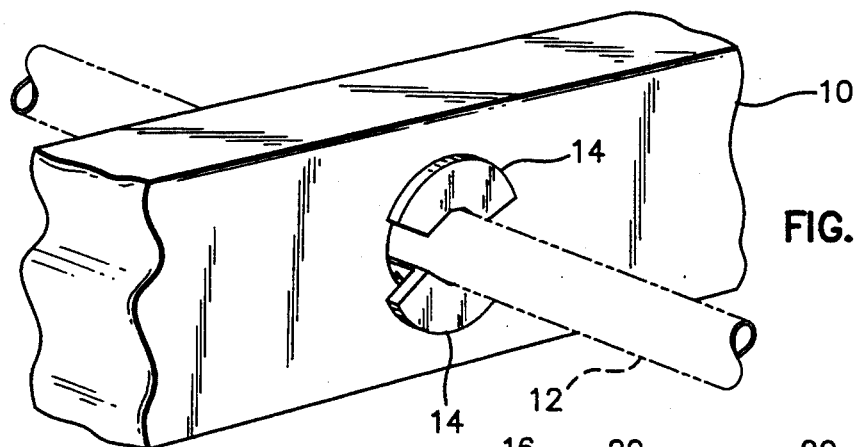
FIG. 1 is a perspective view illustrating a pair of wedge devices rigidly mounting a water pipe shown in phantom lines inside a through-hole extending through a wooden structural support.

Referring to FIG. 1, a structural support 10 has a hole through which extends a water pipe 12. The outer diameter of the pipe 12 is significantly smaller than the inner diameter of the hole such that there is a gap therebetween. A pair of wedge-shaped devices 14 are driven snugly into the gap between the pipe 12 and the structural support 10 to rigidly secure the pipe relative to the structural support. The structural support 10 is either a stud, joist, rafter or similar wooden support through which a hole has been drilled. The hole has a sufficient diameter to permit pipe 12 to be loosely inserted therethrough. The pipe 12 is typically one-half inch copper water pipe. Other size water pipes may be utilized and the pipe may be made of other material, such as cast iron, plastic, metal alloy, and so forth. The size of the hole in the wooden structural support is normally limited by applicable building codes. For example, under most building codes, the hole must be centered between the edges of a wooden stud and must not exceed one-third the width of the stud.

Figure 2:
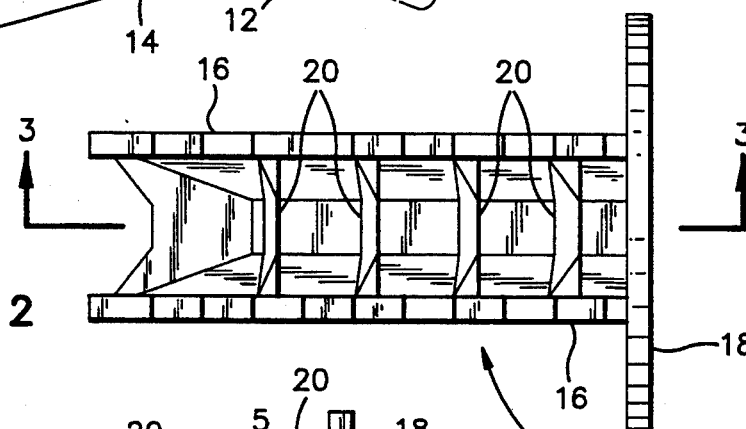
FIG. 2 is an enlarged plan view of a preferred embodiment of the wedge device of the present invention.
Figure 4:
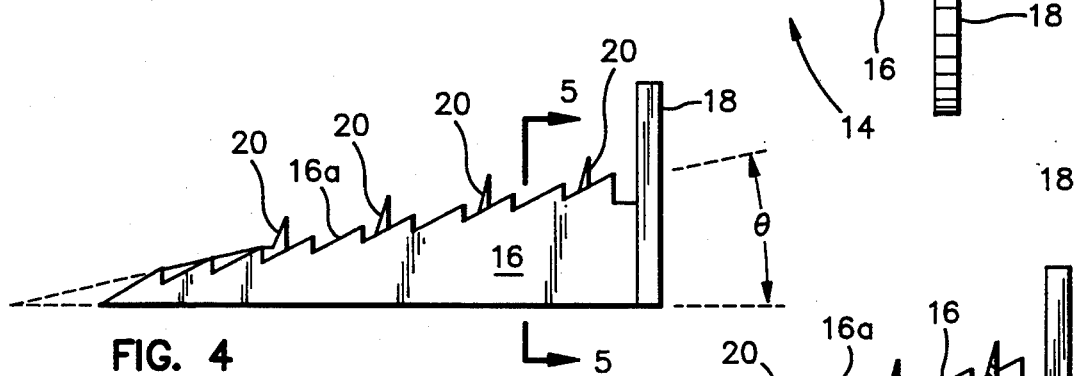
FIG. 4 is a side elevation view of the preferred embodiment of the wedge device.
Figure 3:
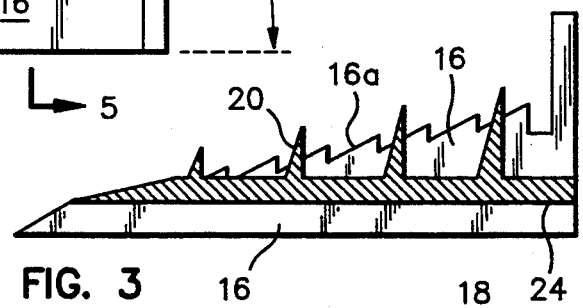
FIG. 3 is a vertical sectional view of the preferred embodiment of the wedge device taken along line 3—3 of FIG. 2.
Figure 5:
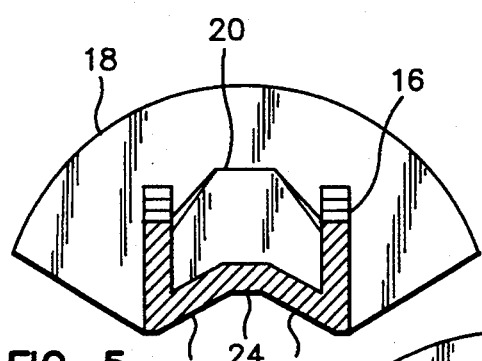
FIG. 5 is a cross-sectional view of the preferred embodiment of the wedge device taken along line 5—5 of FIG. 4.
Figure 6:
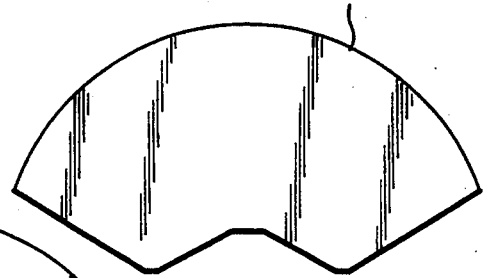
FIG. 6 is an end elevation view of the preferred embodiment of the wedge device taken from the right side of FIG. 2.
Figure 7:
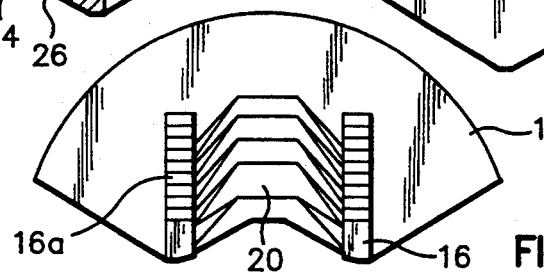
FIG. 7 is an end elevation view of the preferred embodiment of the wedge device taken from the left side of FIG. 2.

Referring to FIG. 2, the preferred embodiment of the wedge-shaped device 14 includes a pair of parallel, spaced-apart triangular ribs 16 which extend in a longitudinal direction and which are connected at their rearward ends by a semi-circular planar flange 18. The ribs 16 have serrated outer edges 16a defining saw projections oriented for engaging the wooden structural support to prevent the device from backing out of the hole once it has been driven into place by hammering on the flange 18. The wedge-shaped device 14 preferrably has an overall angle (theta) of taper of between approximately ten and twenty degrees. A plurality of transversely extending barbs 20 are longitudinally spaced between the ribs 16. As best seen in FIG. 4, the barbs 20 have progressive heights. They are tapered in both the longitudinal direction as best seen in FIG. 3 and the transverse direction as best seen in FIGS. 5 and 7. They provide additional anchoring against the wooden structural support to prevent backing out due to vibration, tension, etc.

The wedge-shaped device 14 has a generally W-shaped cross section as best seen in FIG. 5. The generally concave underside of the wedge-shaped member has a plurality of discrete planar faces 22, 24 and 26 which extend at an angle relative to each other. The faces 22, 24 and 26 of the wedge-shaped member contact the pipe 12. This arrangement of discrete planar faces allows the device to accommodate pipes of different diameters.

The wedge-shaped device 14 is preferably injection molded as a single unitary piece of plastic. FIG. 1 shows a pair of the devices 14 being utilized to rigidly secure the pipe 12 in position. However, it is possible to use a single such device, provided that the gap between the wall of the hole and the pipe is not too large. For very large pipes, three or four such devices may be utilized. It can be seen that the diameter of the hole in the wooden structural support 10 relative to the outer diameter of the pipe 12 is not critical. The extended length of the device and its wedge-shaped configuration can accommodate a wide range of gap sizes.

While I have described a preferred embodiment of my wedge for through-hole mounting of pipe, it should be understood that modifications and adaptations thereof will occur to persons skilled in the art. Accordingly, the protection afforded my invention should only be limited in accordance with the scope of the following claims.

I claim:

1. A device for rigidly mounting a pipe extending through a hole in a wooden structural support in such a manner that there is a gap between the pipe and the structural support, comprising:

a wedge-shaped member having a generally W-shaped cross-section and including a pair of spaced apart parallel longitudinally extending triangular ribs have serrated outer edges, a generally concave underside for contracting and partially encircling the pipe, and a rear end engageable by a hammer for driving the wedge-shaped member into the gap snugly between the wooden structural support and the pipe so that the serrated outer edges of the ribs engage an inner wall of the hole for preventing the wedge-shaped member from backing out of the gap.

2. A device according to claim 1 wherein the wedge-shaped member is injection molded as a single unitary piece of plastic.

3. A device according to claim 1 the wedge-shaped member further includes a plurality of longitudinally spaced barbs that extend along a transverse dimension between the ribs.

4. A device according to claim 3 wherein the barbs are tapered in a transverse direction.

5. A device according to claim 1 wherein the rear end comprises a semi-circular flange.

6. A device according to claim 1 wherein the underside includes a plurality of discrete planar faces that extend at an angle relative to each other.

7. A device according to claim 1 wherein the wedge shaped-member has an overall angle of taper of between about ten and twenty degrees.

8. A device for rigidly mounting a pipe extending through a hole in a wooden structural support in such a manner that there is a gap between the pipe and the structural support, comprising:

a generally wedge-shaped member injection molded as a single unitary piece of plastic, the wedge-shaped member having an overall taper of between about ten and twenty degrees, a rear end flange engageable by a hammer for driving the wedge shaped member into the gap snugly between the wooden structural support and the pipe, a pair of spaced apart triangular ribs with serrated outer edges on an upper side of the wedge-shaped member for engaging the inner wall of the hole for preventing the wedge-shaped member from backing out of the gap, and a plurality of longitudinally spaced transversely extending barbs positioned between the ribs on the upper side of the wedge-shaped member, the barbs having progressive heights corresponding to the overall taper of the wedge-shaped member.

* * * * *